United States Patent [19]

Schulte

[11] Patent Number: 4,522,414
[45] Date of Patent: Jun. 11, 1985

[54] SEAL ASSEMBLY FOR PIVOTAL ROD

[75] Inventor: Heinz Schulte, Marktheidenfeld, Fed. Rep. of Germany

[73] Assignee: Mannesmann Rexroth GmbH, Lohr, Fed. Rep. of Germany

[21] Appl. No.: 649,732

[22] Filed: Sep. 12, 1984

[30] Foreign Application Priority Data

Sep. 14, 1983 [DE] Fed. Rep. of Germany ....... 3333163

[51] Int. Cl.³ .............................................. F16J 15/52
[52] U.S. Cl. ........................... 277/212 R; 277/212 FB
[58] Field of Search ........... 277/212 R, 212 C, 212 F, 277/212 FB

[56] References Cited

U.S. PATENT DOCUMENTS

| 2,020,122 | 11/1935 | Padgett | 277/212 F |
| 2,477,882 | 8/1949 | La Brie | |
| 2,844,168 | 7/1958 | Klingler | 277/212 R |
| 3,038,768 | 6/1962 | Kludt | 277/212 C |
| 3,367,682 | 2/1968 | Meriano | 277/212 R |
| 3,426,531 | 2/1969 | Reznicek et al. | 277/212 R |
| 4,166,627 | 9/1979 | Bainard et al. | 277/212 C |
| 4,220,418 | 9/1980 | Kondo et al. | 277/212 FB |
| 4,342,530 | 8/1982 | Baker | 277/212 FB |
| 4,464,128 | 8/1984 | Aso et al. | 277/212 FB |

FOREIGN PATENT DOCUMENTS 166359 7/1950 Austria .
7214594 3/1972 Fed. Rep. of Germany .
2272315 12/1975 France .

Primary Examiner—Robert I. Smith
Attorney, Agent, or Firm—Andrew M. Wilford

[57] ABSTRACT

The assembly is used with a support having a flat surface and formed with a bore extending generally parallel to but beneath the surface and with a passage extending from the bore to the surface, with a control element in the bore and pivotal therein about an axis generally parallel to the surface, and with a control rod projecting from the element through the passage beyond the surface. This rod is connected to the element and pivots therewith about the axis through an arc on pivoting of the element in the bore about the axis. The assembly comprises an elastomeric annular cuff having an inner periphery tightly engaging and secured against movement on the rod and an outer periphery engaging and slidable on the surface all around the passage and dimensioned to engage the surface all around the passage in any position of the rod. This cuff is prestressed generally parallel to the rod between its peripheries to press at the outer periphery against the surface. Thus as the rod pivots the periphery slides on the surface while remaining in sealing contact therewith. As a result a dust-tight seal is created which allows the rod to move very freely, either pivoting or rotating.

10 Claims, 2 Drawing Figures

SEAL ASSEMBLY FOR PIVOTAL ROD

FIELD OF THE INVENTION

The present invention relates to a seal assembly for a pivotal or swivelable rod. More particularly this invention concerns such an assembly which seals the gap between a rod or the like projecting from a passage at a surface and this surface.

BACKGROUND OF THE INVENTION

In order to seal between a rod centered on an axis and extending from a passage or through a hole in a situation where the rod axis moves relative to the support forming the passage or hole, recourse is usually had to an elastomeric membrane or cuff. German utility model 7,214,594 describes the classic such system. Here the membrane is generally planar and annular. Its inner periphery is clamped between two washers on the rod and its outer periphery is clamped between two parts of the support. Such an arrangement can only permit limited pivoting or swiveling of the rod relative to the support, and cannot compensate for any appreciable rotation of the rod about its axis.

Similarly U.S. Pat. No. 2,477,882 of L. LaBrie describes a seal engaged between a brake-pedal push rod and a master-cylinder piston. This seal is also annular and has an outer surface clamped on the support and an inner periphery that closely engages the cylindrical outer surface of the rod, but that can slide on same, permitting it to rotate or move axially. Such an arrangement can only permit limited nonaxial deflection of the rod and is fairly complex.

Another arrangement permitting substantial axial displacement and rotation of the rod is described in Austrian patent No. 166,359 filed by Fiat with a claim to an Italian priority of 27 June 1945. Here the rod passes through a soft elastomeric seal ring whose outer face is adhered to the support around the passage and whose opposite inner face is engaged by a washer against which a spring bears. This compresses the seal ring axially and forces its inner periphery against the outer surface of the rod, so that same can move axially or rotate, but cannot be tilted much from a position passing perpendicularly through the seal ring. In addition such an arrangement, if tightened enough to seal with the rod passing perpendicularly through it, becomes very tight if the rod is tilted, greatly inhibiting such motion of the rod.

A considerable amount of deflection is possible with the system described in French patent No. 2,272,315 filed by R. B. Bowen et al with a claim to the priority of U.S. application 473,139 filed 24 May 1974. In this system the lever can move all about in a hole over a relatively wide range. The wall through which the passage is formed has a part-spherical inner surface whose center of curvature lies at the pivot point for the lever. A rigid element having a part-cylindrical outer surface is carried on the shaft and engages the inner surface of the support wall, urged thereagainst by a spring, so that a sliding joint is formed. This arrangement makes a fairly good seal, but takes up quite a bit of space while being rather expensive and complex to manufacture.

OBJECTS OF THE INVENTION

It is therefore an object of the present invention to provide an improved seal assembly for a pivotal shaft or rod.

Another object is the provision of such a seal assembly for a pivotal shaft or rod which overcomes the above-given disadvantages, that is which is relatively inexpensive and compact, yet which forms a tight seal and allows a relatively wide degree of movement of the rod.

SUMMARY OF THE INVENTION

The seal assembly according to this invention is used with a support having a flat surface and formed with a bore extending generally parallel to but beneath the surface and with a passage extending from the bore to the surface, with a control element in the bore and pivotal therein about an axis generally parallel to the surface, and with a control rod projecting from the element through the passage beyond the surface. This rod is connected to the element and pivots therewith about the axis through an arc on pivoting of the element in the bore about the axis. The assembly comprises an elastomeric annular cuff having an inner periphery tightly engaging and secured against movement on the rod and an outer periphery engaging and slidable on the surface all around the passage and dimensioned to engage the surface all around the passage in any position of the rod. This cuff is prestressed generally parallel to the rod between its peripheries to press at the outer periphery against the surface. Thus as the rod pivots the periphery slides on the surface while remaining in sealing contact therewith. As a result a dust-tight seal is created which allows the rod to move very freely, either pivoting or rotating.

According to another feature of this invention a spring is braced against the circular outer periphery for pressing same against the surface all around the passage. This spring can have an outer end secured to the rod and an inner end bearing against the outer periphery.

In one such arrangement an anchor element can be provided that is secured to the support and that bears toward the surface on the outer end of the spring. To accommodate movement of the rod by making the anchor point movable, the anchor element is a spring having one leg braced against the surface and another leg bearing against the outer end of the spring. This spring has a coiled central section between its legs and secured to the support.

The first-mentioned spring which bears on the outer cuff periphery is a conical helical spring having a small-diameter end on the rod and a large-diameter end bearing on the outer periphery of the sleeve. Such a spring can greatly increase the prestressing of the cuff, making the sliding seal between it and the support surface last a long time.

In accordance with another feature of this invention the cuff is of omega-section and engages the rod outside the passage offset from the surface. In addition the rod pivots in a direction and the passage has at the surface a length extending in the direction. The outer periphery has a diameter greater than the length by a distance equal at least to the amount of movement of the axis of the rod in the plane of the surface so that even if the rod is deflected all the way in one direction, the outer cuff periphery will still sit on the surface and hermetically close the passage.

DESCRIPTION OF THE DRAWING

The above and other features and advantages will become more readily apparent from the following, reference being made to the accompanying drawing in which.

SPECIFIC DESCRIPTION

Figure 1:
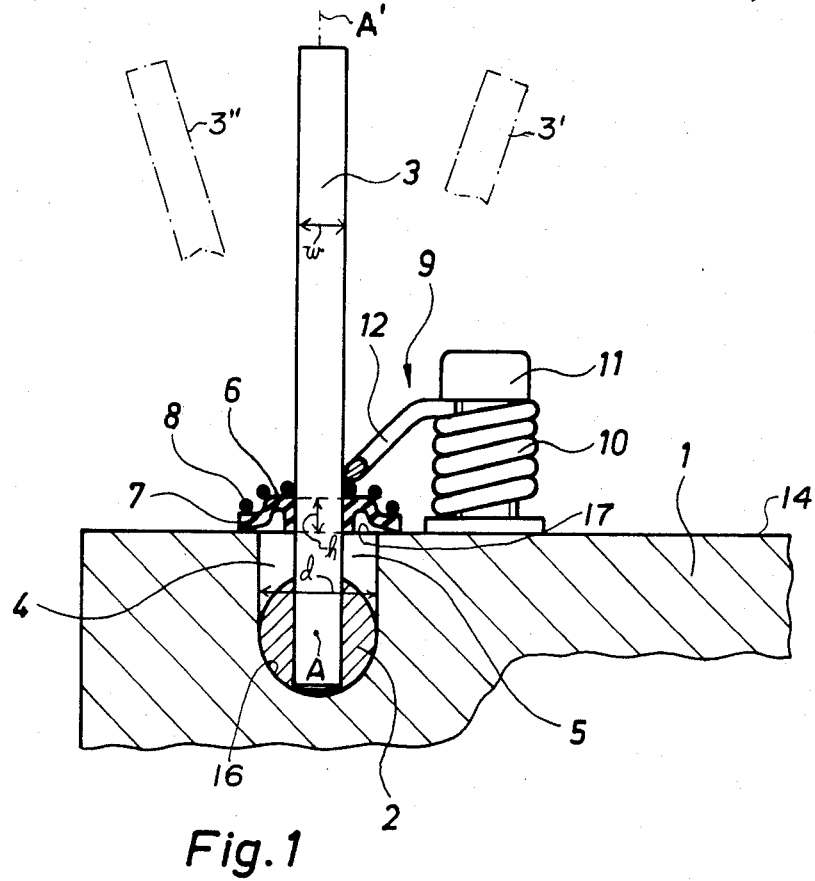
FIG. 1 is a vertical section through the assembly of this invention.

As seen in the drawing, a support plate 1 has a planar horizontal surface 14 and is formed underneath it with a bore 16 centered on an axis A parallel to this surface 14. The support 1 is formed with a rectangular-section window or passage 4, 5 extending perpendicular to the axis A and surface 14 and opening at this surface 14 at an edge or rim 17.

Figure 2:
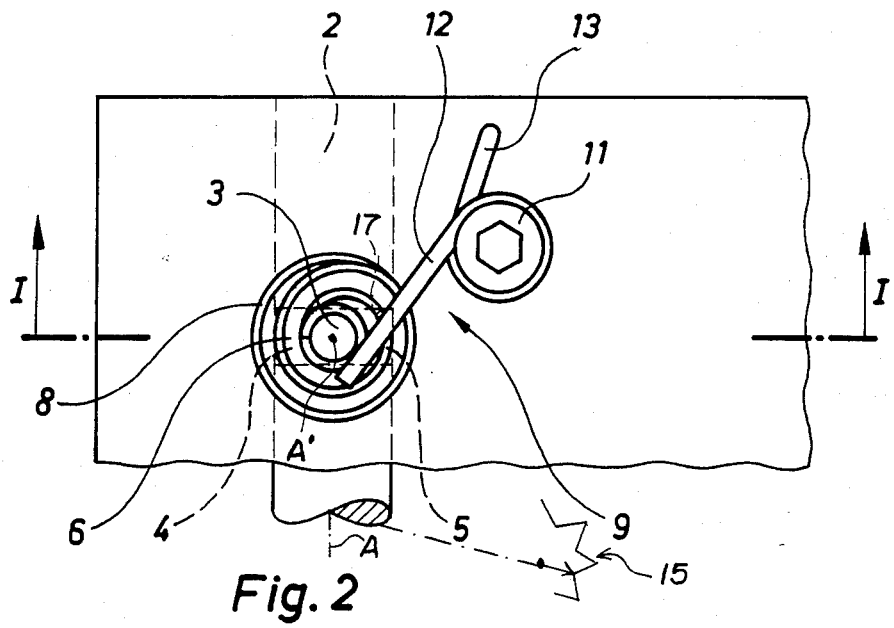
FIG. 2 is a partly schematic top view of the assembly.

A cylindrical shaft or control element 2, which is shown in FIG. 2 to be connected to the wiper of a potentiometer 15 but that could also be a control element of a valve or the like, is pivotal in the bore 16 about the axis A and is fitted with a radially extending control rod 3 of diameter w centered on an axis A'. The passage 4, 5 has a width dimension measured parallel to the axis A and to the surface 14 equal to the rod diameter w and a length dimension d perpendicular thereto that is equal to the diameter of the bore 16 and and shaft 2. Thus the rod 3 can pivot between the positions shown at 3' and 3'', through an arc of about 40°, making one of the sides 4 and 5 of the passage 4, 5 larger and the other smaller. Such pivoting can be effected by hand, or by an appropriate actuator or servomotor, and serves to operate the potentiometer 15 or other device affected by the shaft 2.

This passage 4, 5 is sealed according to the instant invention by a rubber omega-section cuff 6, 7 having a cylindrical inner periphery 6 that fits very tightly around the rod 3 and a circular outer periphery 7 that itself lies flatly on the surface 14 all around the passage 4, 5 and that has an outer diameter equal to somewhat more than the dimension d. This cuff 6, 7 is prestressed to press its periphery or lip 7 against the surface 14. To this end it is compressed in line with axis A' when installed to a height h which is somewhat less than its height when in unmounted and uncompressed condition. As the rod 3 pivots back and forth between the positions 3' and 3'' this cuff 6, 7 moves with the rod 3, with the outer periphery 7 sliding on the surface 14 but always remaining outward of the passage 4, 5. The result is a low-friction but very simple and efficient sliding seal.

In order to increase the force with which the outer edge 7 bears on the planar surface 14, a conical helical spring 18 can be used whose upper and inner periphery tightly surrounds the shaft 3 and whose lower and outer periphery bears in line with the axis A' downward on the outer edge 7 of the cuff 6, 7. This spring 8 is also axially compressed when installed so that it also is prestressed.

A further increase in sealing force is achieved by means of a leg spring 9 having one leg 12 bearing downward on the upper and inner peripheries of the spring 8 and cuff 6, 7, an opposite leg 13 braced against the surface 14, and a central coiled portion 10 fitted around a bolt 11 fixed in the support 1. The leg 12 can move with the seal assembly 6–8 and rod 3 to press down the seal cuff 6, 7 in any position thereof.

The sliding joint between the cuff 6, 7 and the surface 14, which can be greased, has very low friction but uses surface contact to make a very tight hermetic closure of the passage 4, 5 to keep dust out of the bore 16. The surface contact, which seals effectively here where there is no pressure differential across the seal, also minimizes wear to the joint, even if the rod 3 rotates about its axis A'.

I claim:

1. In combination with:
    a support having a flat surface and formed with a bore extending generally parallel to but beneath the surface and with a passage extending from the bore to the surface;
    a control element in the bore and pivotal therein about an axis generally parallel to the surface; and
    a control rod projecting from the element through the passage beyond the surface, the rod being connected to the element and pivoting therewith about the axis through an arc on pivoting of the element in the bore about the axis; a seal assembly comprising:
    an elastomeric annular cuff having an inner periphery tightly engaging and secured against movement on the rod and an outer periphery engaging and slidable on the surface all around the passage and dimensioned to engage the surface all around the passage in any position of the rod, the cuff being prestressed generally parallel to the rod between its peripheries to press at the outer periphery against the surface, whereby as the rod pivots the periphery slides on the surface while remaining in sealing contact therewith.

2. The combination defined in claim 1 wherein the assembly further comprises
    means including a spring braced against the outer periphery for pressing same against the surface all around the passage.

3. The combination defined in claim 2 wherein the spring has an outer end secured to the rod and an inner end bearing against the outer periphery.

4. The combination defined in claim 2 wherein the spring has an inner end bearing against the outer periphery and an outer end spaced therefrom away from the surface, the assembly further comprising
    means including an anchor element secured to the support and bearing toward the surface on the outer end of the spring.

5. The combination defined in claim 4 wherein the anchor element is a spring having one leg braced against the surface and another leg bearing against the outer end of the spring.

6. The combination defined in claim 5 wherein the spring of the anchor element has a coiled central section between its legs and secured to the support.

7. The combination defined in claim 2 wherein the spring is a conical helical spring having a small-diameter end on the rod and a large-diameter end bearing on the outer periphery of the sleeve.

8. The combination defined in claim 1 wherein the cuff is of omega-section and engages the rod outside the passage offset from the surface.

9. The combination defined in claim 1 wherein the rod pivots in a direction and the passage has at the surface a length extending in the direction, the outer periphery having a diameter greater than the length.

10. The combination defined in claim 1 wherein the cuff is continuous and imperforate between its ends.

* * * * *